United States Patent [19]

Sagawa et al.

[11] Patent Number: 5,050,636
[45] Date of Patent: Sep. 24, 1991

[54] RELIEF VALVE

[75] Inventors: Toyoaki Sagawa; Toshiyuki Yoshida, both of Kobe, Japan

[73] Assignee: Kawasaki Jukogyo Kabushiki Kaisha, Hyogo, Japan

[21] Appl. No.: 597,724

[22] Filed: Oct. 17, 1990

[51] Int. Cl.$^5$ .............................................. F16K 21/10
[52] U.S. Cl. ................................... 137/494; 137/514; 137/514.5
[58] Field of Search ...................... 137/494, 514, 514.5

[56] References Cited

U.S. PATENT DOCUMENTS

| | | | |
|---|---|---|---|
| 3,215,236 | 11/1965 | Pensa | 137/494 X |
| 3,966,263 | 6/1976 | Thrush | 137/494 X |
| 4,294,278 | 10/1981 | Blake | 137/494 X |
| 4,653,527 | 3/1987 | Kosarzecki | 137/494 X |

Primary Examiner—John Rivell
Attorney, Agent, or Firm—Wenderoth, Lind & Ponack

[57] ABSTRACT

A relief valve to be disposed in a hydraulic circuit, for example an absolute circuit, such as in an industrial construction machine, comprises a casing of substantially cylindrical structure having one end and another end, the casing including a casing body, a pressure regulating plug and a lid member. The relief valve further comprises a valve seat fitted into one end of the casing and provided with an inflow hole through which a pressurized fluid is flown, a plunger disposed in the casing and having one flanged end slidably engaged with an inner surface of the one end of the casing, the plunger having a central through hole, a stepped piston member disposed in the casing to be slidable therein and having an outwardly stepped one end and a spring member disposed between another end of the stepped piston member and the flanged one end of the plunger. A fluid chamber is defined between another end of the casing and the one end of the stepped piston member. A damping chamber is defined between the stepped portion of the stepped piston member and the stepped portion formed to the casing. The fluid chamber and the damping chamber is communicated with each other through a communication passage. The through hole of the plunger having a throttle portion having a predetermined length and the other end of the stepped piston member having an outer diameter substantially equal to an inner diameter of the inflow hole of the valve seat.

9 Claims, 4 Drawing Sheets

RELIEF VALVE

BACKGROUND OF THE INVENTION

The present invention relates to a relief valve provided with a pressure increase damping property and adapted to control or regulate hydraulic pressure in a hydraulic circuit of a hydraulic motor for swivelling an operation chamber, for example, of an industrial constructional machine such as power shovel.

Generally, a relief valve is disposed in a hydraulic circuit of a hydraulic motor of an industrial constructional machine such as power shovel, for example, for suppressing the increase of the hydraulic pressure to a predetermined value when the power shovel is accelerated or braked. A relief valve utilized for the purpose described above generally includes a damper piston for eliminating or suppressing shock caused at the time when the power shovel is accelerated or braked, for example, as disclosed in the Japanese Utility Model Publication Nos. 63-19668 (19668/1988) and 63-21814 (21814/1988). In the disclosed technique, the hydraulic pressure in the hydraulic circuit at the piston stroke starting time is considerably lower than that at the relief operation starting time.

The hydraulic circuit of the hydraulic motor is constituted by a cross circuit in which two relief valves are non-parallel connected between a pressurized fluid supply port and a pressurized fluid discharge port of the hydraulic motor, or constituted by an absolute pressure circuit in which inflow sides of two relief valves are respectively connected to the pressurized fluid supply and discharge ports, and escape sides of the relief valves are connected to an external tank. The cross circuit additionally requires an overload relief valve, resulting in a complicated structure and increased cost. For this reason, the absolute pressure circuit has often been utilized for the relief valve of the character described above.

However, since there is some degree of hydraulic pressure in a hydraulic circuit of a hydraulic motor at usual times when there is no accelerating time or braking, when the absolute pressure circuit is utilized, a pressure difference is liable to be caused between the inflow side and the escape side of the relief valve, and may result in the completion of operation of the damper piston before the actual start of operation of the relief valve. In such case, the damper effect cannot be attained at all during actual relief valve operation and large shock is thus caused.

This adverse phenomenon may be eliminated by increasing the initial load of the spring urging the piston. However, this technique increases the starting pressure of the relief operation and accordingly, sufficient damper effect cannot be expected, resulting in the generation of a shock.

SUMMARY OF THE INVENTION

An object of the present invention is to substantially eliminate defects or drawbacks encountered in the prior art described above and to provide an improved relief valve utilized for a hydraulic circuit of a construction machine, for example, and which is capable of achieving sufficient damping effects thereby eliminating the generation of shocks by regulating the hydraulic pressure for the relief operation.

This and other objects can be achieved according to the present invention by providing a relief valve to be disposed in a hydraulic circuit comprising a casing of substantially cylindrical structure having one and another ends, a valve seat fitted into one end of the casing and provided with an inflow hole through which a pressurized fluid flows, a plunger of substantially columnar shape disposed in the casing and having one flanged end slidably engaged with an inner surface of the one end of the casing, the plunger having a central through hole extending in an axial direction thereof in communication with the inflow hole of the valve seat, a stepped piston member disposed in the casing and having an outwardly stepped one end slidable along an inner surface of the another end of the casing and an outer surface of another end of the plunger, and a spring member disposed between another end of the stepped piston member and the flanged one end of the plunger, a fluid chamber being defined between another end of the casing and the one end of the stepped piston member, the casing being provided with an inwardly stepped portion and a damping chamber defined between the stepped portions of the stepped piston member and the casing, the fluid chamber and the damping chamber being communicated with each other through a communication passage, the through hole of the plunger having a throttle portion of a predetermined length, and the another end of the stepped piston member having an outer diameter substantially equal to an inner diameter of the inflow hole of the valve seat.

In the preferred embodiments, a piston assembly is further disposed in the fluid chamber for absorbing the plunger stroke volume during low pressure relief operation, the piston assembly comprising a piston having an outer diameter substantially equal to an inner diameter of the stepped piston member and a spring for moving the piston at the same time of movement of the stepped piston member. The casing comprises a casing body having one end into which the valve seat is fitted and another end, a plug member of a hollow structure having one and another end and mounted to the other end of the casing body and a lid member fitted into the one end of the plug member. The casing further includes a flanged sleeve member secured to the inner surface to the plug member and disposed in the casing between the one end of the lid member and the one end of the stepped piston member.

According to the structure of the relief valve of the structure described above, since the outer diameter of the other end of the stepped piston member is made substantially equal to the inner diameter of the inflow hole of the valve seat, the stepped piston stroke starting pressure and the low pressure relief operation starting pressure of the plunger are made substantially equal to each other. Accordingly, the pressure difference between the inlet and outlet portion of the throttle portion of the through hole of the plunger is made significantly small, thus reducing the flow quantity of the fluid passing the throttle portion. In the fluid chamber, there is disposed a piston assembly for absorbing the plunger stroke volume during low pressure relief operation, so that the stepped piston is not moved by the plunger stroke volume and hence, the stepped piston member is moved at a speed in response to the flow quantity of the fluid passing the throttle portion. Since a relatively small quantity of fluid flows through the throttle portion, the stepped piston member is gently moved, thus elongating the damping time. The location of the damping chamber further elongates the damping time.

BRIEF DESCRIPTION OF THE DRAWINGS

For a better understanding of the present invention and to show how the same is carried out, reference is now made, by way of preferred embodiments, to the accompanying drawings, in which.

DESCRIPTION OF THE PREFERRED EMBODIMENT

Figure 9:
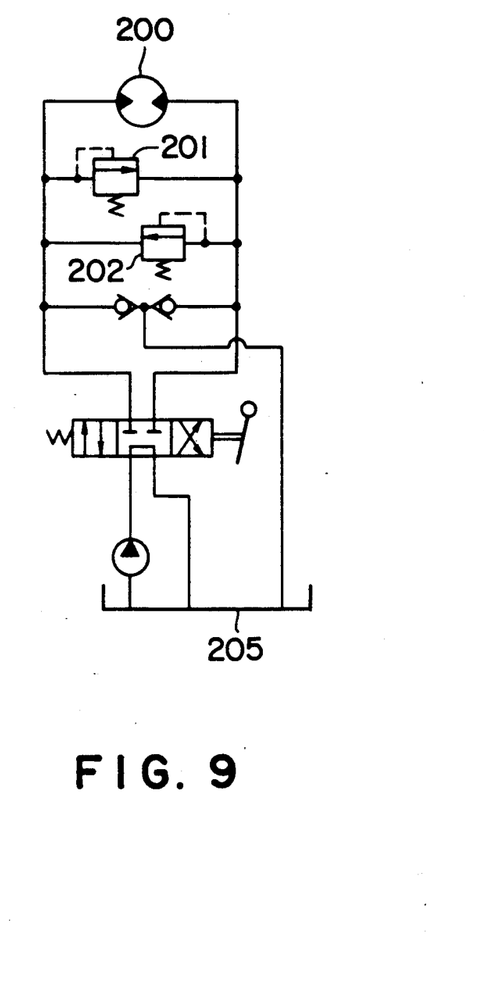
FIGS. 9 and 10 represent a cross circuit and an absolute circuit respectively, as typical examples of a hydraulic circuit for a hydraulic motor, including relief valves.
Figure 10:
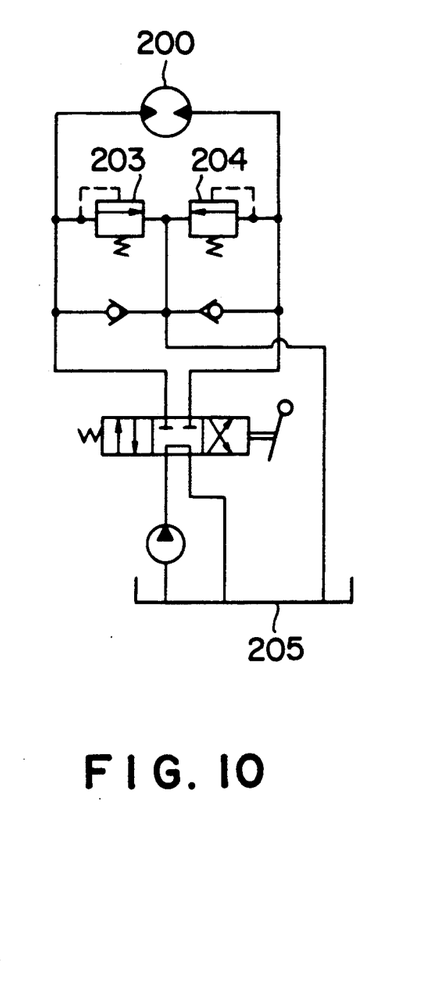

For a better understanding of the present invention, a hydraulic circuit including a relief valve is shown in FIGS. 9 and 10. FIG. 9 represents a cross circuit in which two relief valves 201 and 202 are non-parallel connected between a pressurized fluid supply port and a pressurized fluid discharge port of a hydraulic motor 200. FIG. 10 represents an absolute pressure circuit in which inflow sides of two relief valves 203 and 204 are respectively connected to the pressurized fluid supply and discharge ports of the hydraulic motor 200 and escape sides of the relief valves are connected to an external tank 205. However, as described hereinbefore, the cross circuit additionally requires an overload relief valve, resulting in a complicated structure and consequent cost increase. For this reason, the absolute pressure circuit has been often utilized for the relief valve of the character described above.

However, the conventional absolute circuit also involves the defects described hereinbefore.

The relief valve according to the present invention and conceived in consideration of the above defects of the prior art will be described hereunder with reference to FIGS. 1 to 8.

Figure 1:
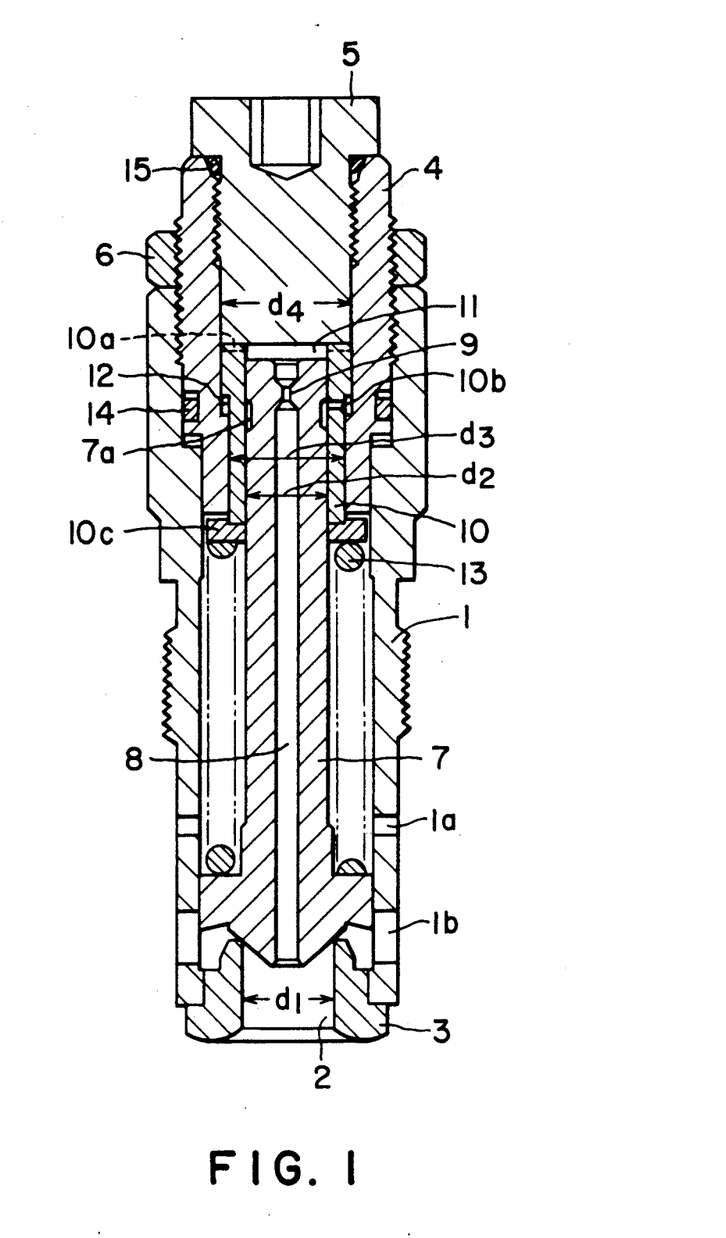
FIG. 1 is an elevational section of a relief valve according to one embodiment of the present invention.

FIG. 1 is an elevational section of a relief valve according to one embodiment of the present invention. Referring to FIG. 1, the relief valve is of a cylindrical casing structure comprising a substantially cylindrical casing body 1 having one (lower, as viewed) end to which an annular valve seat 3 provided with an inflow hole 2 for the hydraulic fluid is coaxially secured. The other (upper, as viewed) end of the cylindrical casing body 1 is formed as an open end having an inner periphery on which male screw threads are formed. With the screw threads of the open end of the casing 1 is engaged one (lower, as viewed) end of a pressure regulating plug 4. The pressure regulating plug 4 has the other open (upper, as viewed) end having an inner periphery on which male screw threads are formed and with the screw threads is engaged a lid member 5 of substantially columnar shape. A lock nut 6 abutting against the upper end of the casing body 1 is engaged with male screw threads formed on the outer periphery of the pressure regulating plug 4.

Figure 2:
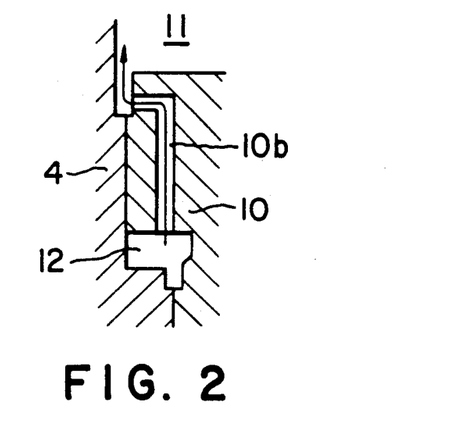
FIGS. 2 and 3 are sectional view showing a damping mechanism of the relief valve shown in FIG. 1.

A plunger 7 of substantially columnar shape has a large-diameter one end (lower, as viewed) and the front portion of this end is formed so as to provide a forwardly tapering frustoconical shape. This lower end of the plunger 7 is fitted into lower end of the casing body 1 to be slidable along the inner periphery thereof. The plunger 7 is provided with a through hole 8 formed at the central portion thereof along the axial direction of the plunger 7. The one (upper, as viewed) end of the through hole 8 is formed to be a fine hole as a throttle portion 9 having a predetermined length. A stepped piston 10 having one (upper, as viewed) end constructed as a large-diameter (stepped) end is fitted into the upper end of the pressure regulating plug 4 so as to be slidable along the inner periphery of the lower end of the plug 4, and the inner periphery of the stepped piston 10 is slidably engaged with the outer periphery of the upper end of the plunger 7. The upper end of the stepped piston 10 is provided with an end face in which a plurality of grooves 10a are formed so as to extend radially and a fluid chamber 11 including the grooves 10a is formed between the stepped piston 10 and the lid member 5. An annular high pressure damping chamber 12 is defined by the stepped portion of the piston 10 and the stepped portion (lower portion) of the pressure regulating plug 4. The damping chamber 12 is communicated with the fluid chamber 11 through a communication passage 10b formed in the stepped piston 10 as shown in FIG. 2.

The stepped piston 10 has the other end (lower, as viewed) to which an annular spring seat 10c is secured and a spring 13 in the form of a coil spring is compressed between the spring seat 10c and the lower end of the plunger 7. A plurality of holes 1a are radially formed in the lower end portion of the casing body 1 and the space between the casing body 1 and the plunger 7 is communicated with an external tank, not shown. A plurality of escape holes 1b are radially formed in a further lower portion of the holes 1a, near the lower end side, of the casing body 1 so that the inflow hole 2 and the external tank are communicated with each other through the escape holes 1b. An O-ring 14 is disposed between the inner periphery of the casing body 1 and the outer periphery of the pressure regulating plug 4 and an O-ring 15 is disposed between the outer periphery of the lid member 5 and the inner periphery of the upper end of the pressure regulating plug 4.

Providing that the diameter of the inflow hole 2 of the seat 3, the inner diameter of the stepped piston 10, the outer diameter of the lower end of the piston 10 and the outer diameter of the upper end of the piston 10 are respectively set to values of $d_1$, $d_2$, $d_3$ and $d_4$, the value $d_3$ is set to be extremely near the value $d_1$ and, in other words, the thickness $(d_3-d_2)$ at the lower side of the stepped piston 10 is made as thin as possible as allowed in view of the strength of the piston 10.

The operation of the embodiment of the structure described above will be described hereunder.

When a hydraulic pressure to be regulated by the relief valve exceeds a predetermined pressure, the stepped piston 10 starts to displace towards the lower end side thereof against the urging force of the spring 13. At this time, the pressure acting on the area of a portion having the diameter $d_1$ of the plunger 7 becomes equal to a value corresponding to the sum of the pressure acting on the opposing portion having the diameter $d_2$ (caused by pressing the stepped piston 10) and the spring force of the spring 13. Accordingly, the plunger 7 is moved upwardly against the spring force of the spring 13 and a gap is formed between the lower end face of the plunger 7 and the valve seat 3 and, hence, the hydraulic fluid that has flowed into the inflow hole 2 escapes into the tank through the escape holes 1b. Namely, the relief operation starts. This relief pressure increases gradually until the stepped piston 10 reaches the stroke limit thereof, and the predetermined set pressure value is reached, due to both functions of the increase of the spring load by the displacement of the piston towards the lower side and the compression of the spring 13 and of the increase of the pressure acting on the piston 10 caused by the damping force to the piston 10, i.e. the pressure acting on a side opposing to the valve seat side of the plunger 7. Accordingly, the moving time, i.e. the pressure increasing time of the piston 10, can be sufficiently increased for the reason that the pressure pressing the stepped piston 10 is increased in proportion to the increase of the hydraulic pressure in the high-pressure damping chamber 12 due to the movement of the stepped piston 10, and the hydraulic fluid flow for the stroke of the piston is therefore made small due to the decrease of the pressure difference between the inlet and outlet portions of the throttle portion 9 of the through hole 8 of the plunger 7.

Moreover, the outer diameter $d_3$ of the lower portion of the stepped piston 10 is made substantially equal to the diameter $d_1$ of the inflow hole 2, so that the difference between the stroke starting hydraulic pressure and the relief operation starting hydraulic pressure of the stepped piston 10 can be reduced. Accordingly, the stroke starting pressure for the stepped piston 10 can be set to a value significantly higher than that of a conventional relief valve and moreover, the relief operation starting pressure, i.e. damper pressure, can be also set to a small value.

Furthermore, according to the structure of the casing comprising the casing body 1, the pressure regulating plug 4 and the lid member 5, the final set pressure and the low pressure damping pressure can be simultaneously regulated by regulating the position of the pressure regulating plug 4 thereby changing the initial load of the spring 13.

This operation or function will be considered hereunder with reference to the following equations.

$$(\pi/4)\cdot(d_3^2-d_2^2)\cdot P_B = W_O$$

where
 $W_O$: initial load of the spring 13;
 W: stroke end load of the spring 13;
 $P_B$: pressure in the fluid chamber 11 at the piston stroke starting time of the stepped piston 10.
This expression is arranged to the following.

$$P_B = 4W_O/\{\pi(d_3^2-d_2^2)\}$$

Now providing that the hydraulic pressure of the inflow hole 2, i.e. low relief pressure is $P_A$, the following equation is obtained.

$$(\pi/4)d_1^2\cdot P_A = W_O + (\pi/4)d_2^2\cdot P_B$$

According to the above equations, the equation $$P_A = 4W_O d_3^2/\{\pi d_1^2\cdot(d_3^2-d_2^2)\}$$

is obtained.

With reference to this equation, when the value $d_3$ approaches the value $d_1$, the pressure value $P_B$ approaches the value $P_A$. The value $d_3$ is determined by the limit of the thickness, i.e. $(d_3-d_2)$, for example, and when the value $d_3$ extremely approaches the value $d_1$, the following equation is obtained.

$$P_B \geqq 0.12 P_S$$

$$P_A = 0.15 \sim 0.2 P_S$$

(where the value $P_S$ is a final relief pressure)

The increasing pressure damping process will be explained by way of equations, in which symbol $S_1$ represents a seat area of the plunger 7 and the valve seat 3, $S_2$ is a cross-sectional area of the inner-diameter portion of the piston 10, $S_3$ is a cross sectional area of the large-diameter portion of the piston 10 and $S_4$ is a cross-sectional area of the small diameter portion of the piston 10. It will be easily understood that the following equations are established.

$$S_1 = \pi d_1^2/4$$

$$S_2 = \pi d_2^2/4$$

$$S_3 = \pi d_3^2/4$$

$$S_4 = \pi d_4^2/4$$

Various factors and items are represented as follows.
 $P_A$: pressure at the upstream side of the plunger 7, i.e. relief pressure;
 $P_S$: pressure in the fluid chamber, i.e. differential chamber pressure;
 $W_O$: initial load of the spring 13;
 W: load of the spring 13 at a time when the piston 10 reaches its stroke end.

First, in consideration of a case where the hydraulic pressure to be supplied to the inflow hole 2 is increased from a pressure corresponding to the pressure in the tank, the pressure at the inflow hole 2 first corresponds to the pressure in the tank and the pressures in the through hole 8 and the fluid chamber 11 also correspond to the tank pressure. The stepped piston 10 is hence pressed to the lid member 5 by the spring 13.

Now, in the case where a damping force is not applied to the stepped piston 10, the pressure $P_{B1}$ in the fluid chamber 11 is expressed as follows by the dynamic equilibrium of the stepped piston 10 with respect to the initial load of the spring 13.

$$P_{B1}(S_4-S_2)-P_1$$

$$P_{B1} = P_1/(S_4-S_2)$$

In that case, the relief pressure $P_{A1}$ is expressed as follows.

$$PS_1 \cdot S_1 = W_O + P_{B1} \cdot S_2$$

$$PA_1 = (W_O + P_{B1} \cdot S_2)/S_1$$

In this equation, the letter $P_{A1}$ represents a start pressure for increasing the pressure. In a case where any damping force is not applied to the stepped piston 10, the pressurized fluid flows into the through hole 8 and the fluid chamber 11 through the throttle portion 9 with the pressure difference of $\Delta P = P_A - P_B$, and the stepped piston 10 is therefore moved downward by the pressure difference.

Next, in consideration of the pressure $P_B$ in the fluid chamber 11, a pressure $P_{B2}$ therein just before the stroke end of the stepped piston 10 can be expressed as follows.

$$P_{B2} \cdot (S_4 - S_2) = W$$

$$P_{B2} = W/(S_4 - S_2).$$

The relief pressure $P_{A2}$ in that case is represented by the following equation.

$$P_{A2} = (P_2 + P_{B2} \cdot S_2)/S_1$$

Figure 4:
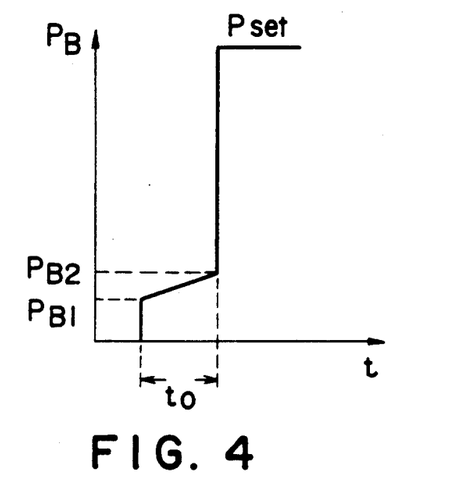
FIG. 4 is a graph, in a case where a damping chamber is not formed, representing the variation of hydraulic pressure acting on a stepped piston at the arrival of the stroke end thereof and accommodated in the relief valve shown in FIG. 1.

However, since the pressure $P_B$ in the fluid chamber 11 equilibrates to the relief pressure $P_A$ just at the instant when the stepped piston 10 reaches its stroke end, the relief pressure $P_A$ increases rapidly. FIG. 4 represents the variation of the increasing pressure acting on the stepped piston and FIG. 5 represents the increasing relief pressure variation.

Figure 3:
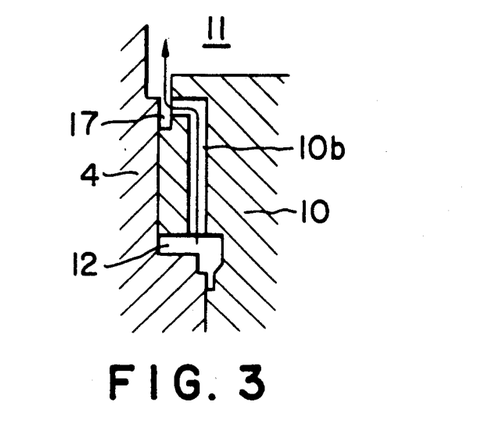
Figure 5:
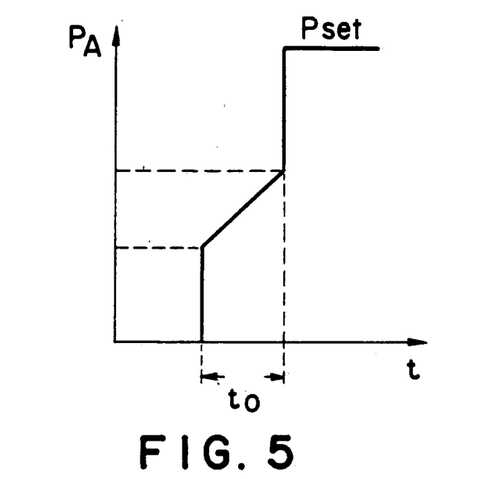
FIG. 5 is a graph representing the variation of the relief pressure in the same condition as that of FIG. 4.

As can be seen from these figures, however, the pressure increasing states in both cases of FIGS. 4 and 5 are not gentle. In order to gently increase the pressure, the high pressure damping chamber 12 is defined between the stepped portions of the stepped piston 10 and the pressure regulating plug 4 to thereby acting a back pressure in the high pressure chamber 12 on the stepped piston 10. Namely, in accordance with the stroke of the stepped piston 10, a large damping force is applied to the stepped piston 10. This can be achieved by the location of the throttle portion 17 as shown in FIG. 3.

In this operation, the following equations are obtained.

A dynamic equilibrium equation to the plunger 7:

$$S_1 \cdot P_A(t) = S_2 \cdot P_B(t) + W(t) \quad (2)$$

A dynamic equilibrium equation to the piston 10:

$$(S_3 - S_2) \cdot P_B(t) = (S_3 - S_4) \cdot P_C(t) + W(t) \quad (2)$$

where $P_C$: back pressure in the high pressure damping chamber 12;
$P_A(t)$: time function of the relief pressure;
$P_B(t)$: time function of the pressure in the fluid chamber;
$P_C(t)$: time function of the pressure in the high pressure damping chamber;
$W(t)$: time function of the spring force of the spring;
X: stroke displacement of the stepped piston.

A time function of the quantity $Q(t)$ of the flow from the throttle portion 9 into the fluid chamber 11 is expressed as follows.

$$Q(t) = (S_4 - S_2) \, dx/dt \quad (3)$$

When the throttle portion 9 attains the orifice function, the following equation is obtained on the basis of Bernoulli's equation.

$$P_A(t) - P_B(t) = \rho \{Q(t)\}^2 / 2C^2 \cdot f^2 \quad (4)$$

where C is flow quantity coefficient, $\rho$ is density of operating oil and f is a throttling cross sectional area.

A time function P(t) of the spring force of the spring 13 is expressed as follows.

$$W(t) = W_O + kdx \quad (5)$$

where k is a spring constant.

In accordance with the above described equations (1) to (5), the variables of the $P_A(t)$, $P_B(t)$, $P_C(t)$, F(t) and Q(t) are obtained and the following conclusion will be led from the results obtained.

The time required for the variables $P_A(t)$ and for $P_B(t)$ to increase to the final set pressures correspond to the time interval between the stroke start time to the controlled by the flow quantity Q(t) of the fluid into the fluid chamber 11 through the throttle portion 9 as represented by the equation (3).

The flow quantity Q(t) is controlled by the pressure difference between $P_A(t)$ and $P_B(t)$ as represented by the equation (4).

The following equation is obtained from the equation (1).

$$P_A(t) - P_B(t) = (S_2 \cdot P_B(t) + P(t))/S_1$$

$$-P_B(t) = P(t)/S_1 - (1 - S_2/S_1) \cdot P_B(t)$$

As is apparent from the equation (2), $P_B(t)$ has a value under the damping function, i.e. under the function of the $P_C(t)$, larger than that under no damping function.

In the aforementioned equation, since the relationship $(1 - S_2/S_1 > 0)$ is established, the value of $P_A(t) - P_B(t)$ is made small when the damping function, i.e. the $P_C(t)$ function, is attained.

Accordingly, when the damping function is attained to the stepped piston 10, the time function Q(t) of the quantity of the flow into the fluid chamber 11 is made small. Namely, the time required for the stepped piston between the stroke start time and the stroke end time is made long in the case where the damping function is attained in comparison with the case where the damping function is not attained.

Figure 6:
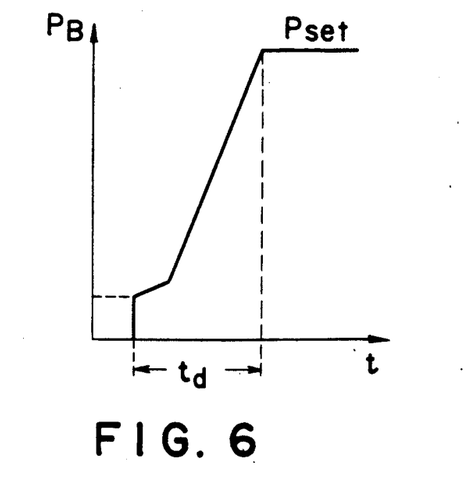
FIG. 6 is a graph, in a case where the damping chamber is formed, representing the relationship between the hydraulic pressure acting on the stepped piston and the time at the relief operation starting time.
Figure 7:
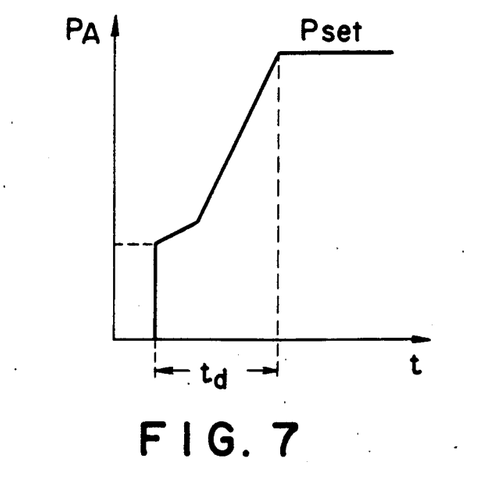
FIG. 7 is a graph representing the relationship between the relief pressure and the time for the same situation as that of FIG. 6.

The time variables $P_B(t)$ and $P_A(t)$ can be set so as to smoothly and continuously increase towards the final set pressures Pset as represented by FIGS. 5 and 6, respectively, by properly setting te throttle 17.

As described hereinbefore, the pressure increase time td to the final set pressure is made large, i.e. td > t0 in comparison with the pressure increasing tim t0 in which the damping function is not attained, and substantially linear pressure curve increasing to the final set pressure can be obtained.

Under these conditions, when the stepped piston 10 starts the stroke operation, the pressurized fluid passing the inflow hole 2 flows into the fluid chamber 11 through the throttle portion 9. The quantity Q of the pressurized fluid flowing into the fluid chamber 11 is expressed as follows.

$$Q = C \cdot f \{2(P_A - P_B)/\rho\}^{\frac{1}{2}}$$

where f is sectional area of the throttle portion 9. In the above equation, Q, $P_A$ and $P_B$ are functions of time t and, accordingly, the time interval between the stroke start time and the stroke end time of the stepped piston 10, i.e. the increasing pressure damping time, is determined by the value Q.

In this embodiment, since the value $d_3$ is set so as to be extremely close to the value $d_1$, it may be considered that the stroke volume of the stepped piston 10 is made small and the increasing pressure damping time is made short, but, in actual, since the value $(P_A - P_B)$ is small, the value Q is also small and the increasing pressure damping time is not shortened.

In the described embodiment, the casing is composed of the casing body 1, the pressure regulating plug 4 and the lid member 5, but the present invention is not limited to this described embodiment and the casing may be constructed as a unitary structure.

Figure 8:
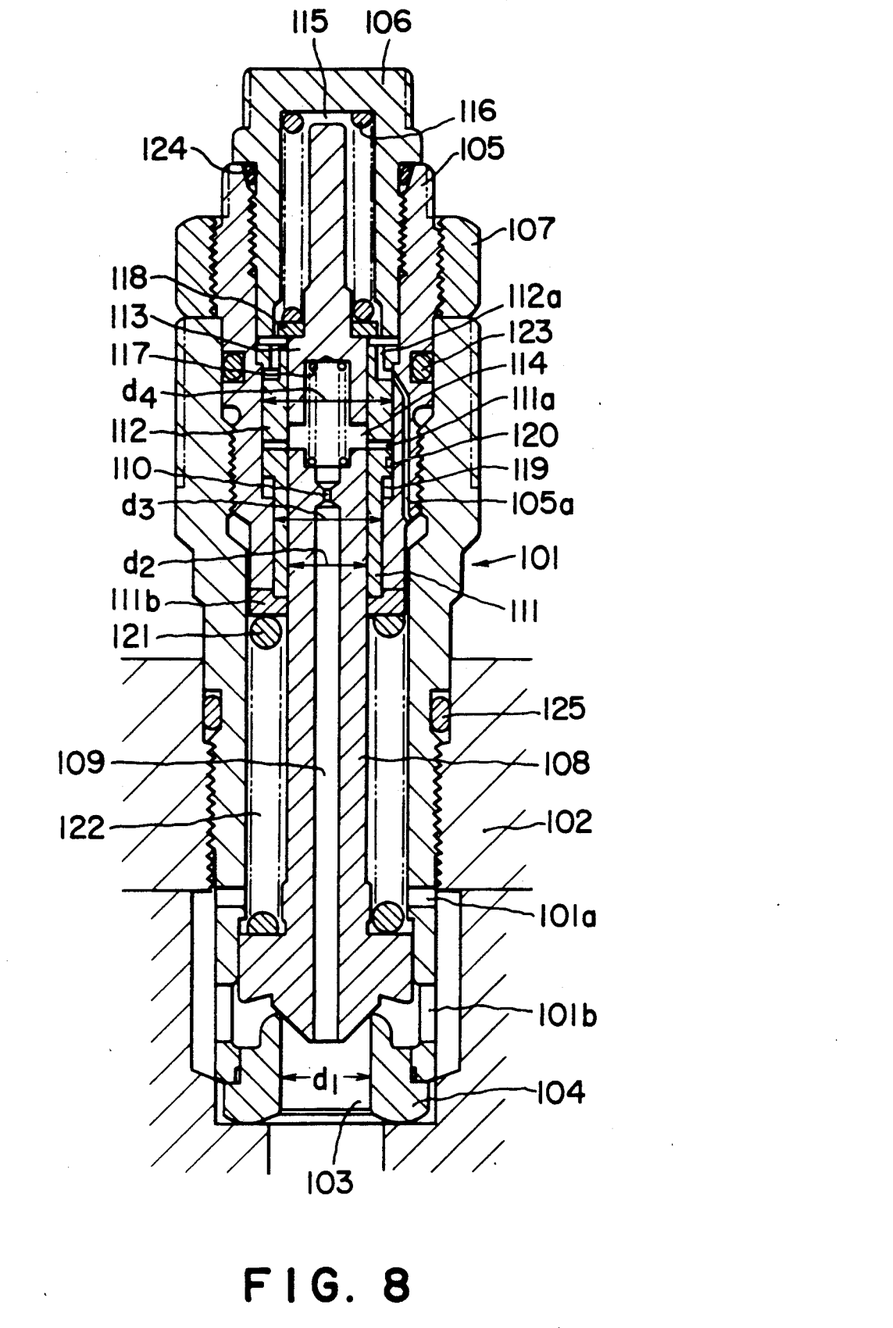
FIG. 8 is an elevational section of a relief valve according to another embodiment of the present invention.

FIG. 8 is an elevational section of a relief valve according to another embodiment of the present invention.

Referring to FIG. 8, the relief valve is of a cylindrical casing structure 102 comprising a substantially cylindrical casing body 101 having one, lower as viewed, end to which an annular valve seat 104 provided with an inflow hole 103 for the hydraulic fluid is coaxially secured. The other, upper as viewed, end of the cylindrical casing body 101 is formed as an open end having an inner periphery on which male screw threads are formed. With the screw threads of the open end of the casing 101 is engaged one (lower, as viewed) end of a pressure regulating plug 105. The pressure regulating plug 105 has the other open (upper, as viewed) end having an inner periphery on which male screw threads are formed and with the screw threads is engaged a lid member 106 of substantially columnar shape. The lid member has a flanged portion. A clock nut 107 abutting against the upper end of the casing body 101 is engaged with male screw threads formed on the outer periphery of the pressure regulating plug 105.

A plunger 108 of substantially columnar shape has a large-diameter one end (lower, as viewed) and the front portion of this end is formed so as to provide a forwardly tapering frustoconical shape. This lower end of the plunger 108 is fitted into lower end of the casing body 101 to be slidable along the inner periphery thereof. The plunger 108 is provided with a through hole 109 formed at the central portion thereof along the axial direction of the plunger 108. The one (upper, as viewed) end of the through hole 109 is formed to be a fine hole as a throttle portion 110 having a predetermined length. A stepped piston 111 having one (upper, as viewed) end constructed as a large-diameter end is fitted into the upper end of the pressure regulating plug 105 so as to be slidable along the inner periphery of the lower end of the plug 105, and the inner periphery of the stepped piston 111 is slidably engaged with the outer periphery of the upper end of the plunger 108. The upper end of the stepped piston 111 is provided with an end face in which a plurality of grooves 111a are formed so as to extend radially.

The above described structure of the relief valve of this embodiment is substantially identical to that of the first embodiment.

In the second embodiment, the upper end face of the stepped piston 111 abuts against a lower surface of a flanged sleeve 112 secured to the pressure regulating plug 105 when the piston takes the upper stroke end.

The flanged sleeve 112 is provided with the inner hollow portion and a piston 113 is fitted into the hollow portion so as to be slidable along the inner peripheral surface of the sleeve 112. A fluid chamber 114 is defined by the stepped piston 111, the plunger 108, the pressure regulating plug 106, the flanged sleeve 112 and the piston 113.

The piston 113 is disposed in a compressed manner between a coil spring 116 accommodated in a compressed manner in a chamber 115 formed in the flanged lid member 106 and a coil spring 117 disposed in a compressed manner between the piston 113 and the plunger 108. A spring seat 118 of the coil spring 116 abuts against the end face of the flanged portion of the sleeve 112 at the forward, i.e. lower, stroke end of the piston 113. The piston 113 has a portion fitted into the flanged sleeve 112 and the portion has an outer diameter corresponding to the inner diameter $d_2$ of the stepped piston 111.

The coil spring 116 acts to absorb the stroke volume of the plunger 108 at the low pressure relief operation time so that the piston 113 and the stepped piston 111 are simultaneously moved. The coil spring 117 acts to move the piston 113 so as to abut against the spring seat 118 and, accordingly, a coil having a relatively weak spring force is utilized for the coil spring 117. A small chamber 119 is defined by the stepped portion of the stepped piston 111 and the stepped portion of the pressure regulating plug 105 and this small chamber is constructed as a damping chamber 119 by communicating the chamber 119 and the fluid chamber 114 through a communication passage 120 constituted as a fine hole.

The stepped piston 111 has the other end (lower, as viewed) to which an annular spring seat 111b is secured and a spring 121 in the form of a coil spring is compressed between the spring seat 111b and the large-diameter lower end of the plunger 108. A plurality of holes 101a are radially formed in the lower end portion of the casing body 101 so that a spring chamber 21 in which the coil spring 121 is accommodated is communicated with an external tank, not shown. A plurality of escape holes 101b are radially formed in a further lower portion of the holes 101a, near the lower end side, of the casing body 101 so that the inflow hole 103 and the external tank are communicated with each other through the escape holes 101b. A spring chamber 115 disposed behind the piston 113 is communicated with the tank through a communication hole 112a formed in the flanged sleeve 112, a communication hole 105a formed in the pressure regulating plug 105, the spring chamber 122 and the hole 101a.

An O-ring 123 is disposed between the inner periphery of the casing body 101 and the outer periphery of the pressure-regulating plug 105 and an O-ring 124 is disposed between the outer periphery of the flanged lid member 106 and the inner periphery of the upper end of the pressure regulating plug 105. An O-ring 125 is further disposed between the outer periphery of the casing body 101 and the inner periphery of the casing 102.

In this embodiment, the casing is composed of the casing body 101, the pressure-regulating plug 105 and the flanged lid member 106 so that the maximum set pressure and the lower pressure damping pressure of the relief valve can be simultaneously controlled or regulated by changing the initial load of the coil spring 121 by means of the pressure regulating plug 105.

Providing that the diameter of the inflow hole 103 of the valve seat 104, the inner diameter of the stepped piston 111, the outer diameter of the lower end of the piston 111 and the outer diameter of the upper end of the piston 111 are respectively set to values of $d_1$, $d_2$, $d_3$ and $d_4$, the value $d_3$ is set to be extremely near the value $d_1$ and, in other words, the thickness $(d_3-d_2)$ at the lower side of the stepped piston 111 is made as thin as possible in view of the strength of the piston 111.

The operation or function of this embodiment will be described hereunder by way of equations.

When the hydraulic pressure of the fluid passing the inflow hole 103 exceeds a predetermined pressure, the stepped piston moves in downwards to compress the spring 121 and at this time, the stepped piston movement starting pressure is substantially equal to the low pressure relief operation starting pressure of the plunger 108. This will be expressed as follows.

$$(\pi/4) \cdot (d_3^2 - d_2^2) \times P_2 = W_O$$

where $W_O$: initial load of the spring when the stepped piston is positioned at its upper limit position;

$P_2$: lowering movement starting pressure of the stepped piston 111;

This expression is arranged as follows.

$$P_2 = 4W_O/\pi(d_3^2 - d_2^2) \quad (11)$$

Now providing that the hydraulic pressure of the inflow hole 103 is $P_1$, the following equation is obtained.

$$(\pi 4) d_1^2 \times P_1 = W_O + P_2 \times (\pi/4) d_2^2 \quad (12)$$

According to the above equations (11) and (12), the equation, $$(\pi/4) d_1^2 \times P_1 = W_O + \{4W_O/\pi(d_3^2 - d_2^2)\} \cdot (\pi/4) d_2^2$$

$$P_1 = 4W_O d_3^2 / \pi d_1^2 (d_3^2 - d_2^2) \quad (13)$$

is obtained.

The equation, $$P_1 = P_2 \times d_3^2 / d_1^2$$

is obtained by applying the equation (13) to that (11).

With reference to this equation, when the value $d_3$ approaches the value $d_1$, the pressure value $P_1$ approaches the value $P_2$. The value $d_3$ is determined by the limit of the thickness, i.e. $(d_3 - d_2)$, for example, and when the value $d_3$ extremely approaches to the value $d_1$, the following equations are obtained.

$$P_2 \geq 0.12 P_S$$

$$P_1 = 0.15 \sim 0.2 P_S$$

(where the value $P_S$ is the maximum set pressure of the relief valve).

As described above, the stepped piston lowering movement starting pressure $P_2$ is made substantially equal to the low pressure relief operation starting pressure $P_1$ of the plunger 108 by making the smaller outer diameter $d_3$ of the stepped piston 111 substantially equal to the diameter $d_1$ of the inflow hole 103. Accordingly, the difference between the pressure for stroking the stepped piston 111 and the relief pressure is made small and, hence, the pressure difference between the inlet and outlet portions of the throttle portion 110 is made small during the lowering movement of the stepped piston 111, whereby the flow quantity of the fluid passing the throttle portion 110 is also made small.

When the low pressure relief operation of the plunger 108 is started, the communication between the inflow hole 103 and the escape hole 101b is established and the pressurized fluid flown in the inflow hole 103 is circulated into the external tank through the escape hole 101b. Since this relief operation is carried out under the low pressure condition, the stroke amount of the plunger 108 is made relatively large and the plunger stroke volume in the fluid chamber 114 is also made large. However, in the fluid chamber 114, the piston 113 and the spring 116 are accommodated to absorb the plunger stroke volume. Accordingly, the stepped piston 111 is not influenced to move by the plunger stroke volume and is moved downward with the lowering speed corresponding to the flow quantity of the fluid passing the throttle portion 110. The flow quantity of the fluid through the throttle portion, as described before, is made small, so that the stepped piston is gently lowered and the damping time is hence made longer. Moreover, in this embodiment, the small chamber 119 is constructed as the damping chamber by constructing the through hole 120 as a fine hole, so that the discharge quantity of the fluid into the fluid chamber 114 is throttled, thus further elongating the damping time. According to the operations described above, when the stepped piston 11 reaches its stroke end, the pressures in the fluid chamber 114 and the inflow hole 103 are made substantially equal, and the relief valve is thereby set to the maximum set value.

It is to be understood that the present invention is not limited to the described embodiments and many other changes and modifications may be made without departing from the scope of the appended claims.

What is claimed is:

1. A relief valve to be disposed in a hydraulic circuit, comprising:

a casing of substantially cylindrical structure having one and another ends;

a valve seat fitted into one end of said casing and provided with an inflow hole through which a pressurized fluid flows;

a plunger of substantially columnar shape disposed in said casing and having one flanged end slidably engaged with an inner surface of said one end of the casing, said plunger having a central through hole extending in an axial direction thereof in communication with said inflow hole of the valve seat;

a stepped piston member disposed in said casing and having an outwardly stepped one end slidable along an inner surface of the other end of said casing and an outer surface of another end of said plunger; and a spring member disposed between the other end of said stepped piston member and the flanged one end of said plunger, a fluid chamber being defined between another end of said casing and the one end of said stepped piston member, said casing being provided with an inwardly stepped portion and a damping chamber being defined between said stepped portions of said stepped piston member and said casing, said fluid chamber and said damping chamber being communicated with each other through a communication passage, said through hole of the plunger having a throttle portion having a predetermined length, and said other end of said stepped piston member having an outer diameter substantially equal to an inner diameter of said inflow hole of the valve seat.

2. The relief valve according to claim 1, further comprising a piston assembly disposed in said fluid chamber for absorbing plunger stroke volume in low pressure relief operation, said piston assembly comprising a piston having an outer diameter substantially equal to an inner diameter of said stepped piston member and a spring for moving said piston at the same time of movement of said stepped piston member.

3. The relief valve according to claim 1, wherein said casing comprising a casing body having one end into which said valve seat is fitted and another end, a plug member of a hollow structure having one end and another end and mounted to said another end of the casing body and a lid member fitted into the one end of said plug member.

4. The relief valve according to claim 3, wherein the stepped piston member is disposed in said casing to be slidable along an inner surface of said plug member and the outer periphery of the another end of said plunger.

5. The relief valve according to claim 3, wherein said plug member is provided with an inwardly stepped portion formed to the other end thereof and said damping chamber being defined between the stepped portions of said stepped piston member and said plug member.

6. The relief valve according to claim 3, wherein said fluid chamber is formed between one end of said lid member and the one end of said stepped piston member and said fluid chamber includes a plurality of grooves formed in an end face of the one end of said stepped piston member.

7. The relief valve according to claim 6, wherein said grooves extend in radial directions of the end face of said stepped piston member.

8. The relief valve according to claim 3, wherein said casing further includes a flanged sleeve member secured to the inner surface to said plug member and disposed in said casing between the one end of said lid member and the one end of said stepped piston member.

9. The relief valve according to claim 1, wherein said communication passage is provided with a throttle portion.

* * * * *